United States Patent [19]
Pagani

[11] 4,161,078
[45] Jul. 17, 1979

[54] FISHING LINE SUBMERGING DEVICE

[76] Inventor: George B. Pagani, 733 Melva Ave., Oakdale, Calif. 95361

[21] Appl. No.: 876,058

[22] Filed: Feb. 8, 1978

Related U.S. Application Data

[63] Continuation-in-part of Ser. No. 740,222, Nov. 9, 1976, abandoned.

[51] Int. Cl.² .............................................. A01K 95/00
[52] U.S. Cl. .................................. 43/43.13; 43/42.04; 43/42.22
[58] Field of Search ................. 43/42.03, 42.04, 42.22, 43/43.12, 43.13

[56] References Cited

U.S. PATENT DOCUMENTS

| 2,542,347 | 2/1951 | Muller | 43/43.13 |
| 2,843,966 | 7/1958 | Ingram et al. | 43/43.13 |
| 2,976,642 | 3/1961 | Wickman et al. | 43/43.13 |
| 3,023,537 | 3/1962 | Madson | 43/43.13 |

*Primary Examiner*—Robert C. Watson
*Attorney, Agent, or Firm*—Jack L. Bohan

[57] ABSTRACT

A fishing line submerging device having a diving fin which will cause the device to run at a selected depth but which fin releases, upon a strike by the fish, to present a minimum of hydrodynamic resistance to the fishing line, regardless of whether the line is being reeled in or played out during the course of bringing the fish in.

4 Claims, 5 Drawing Figures

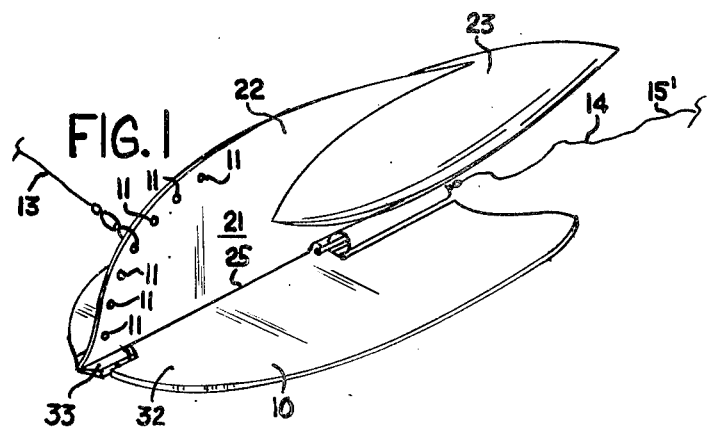
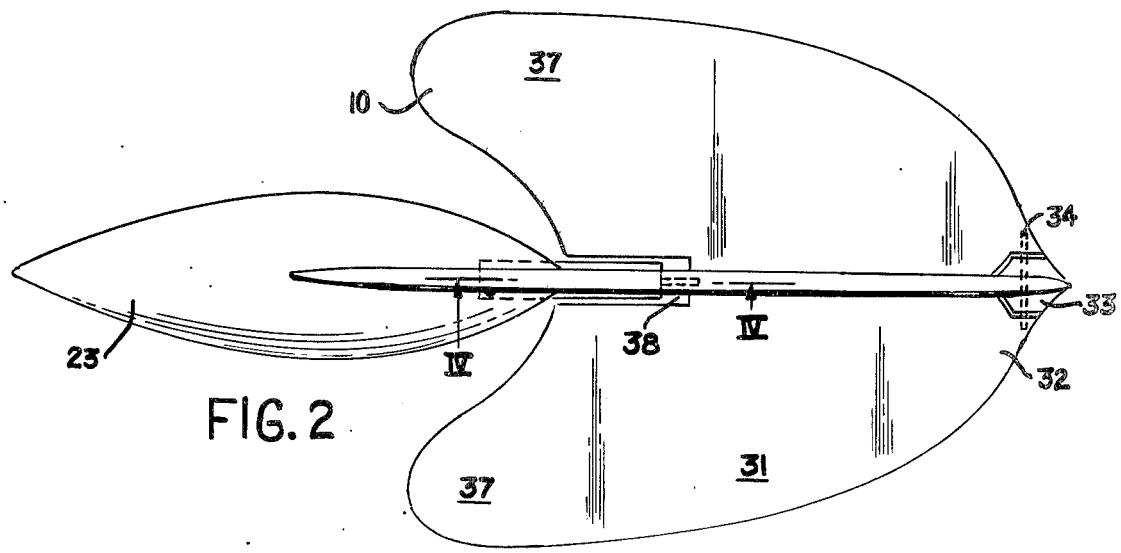
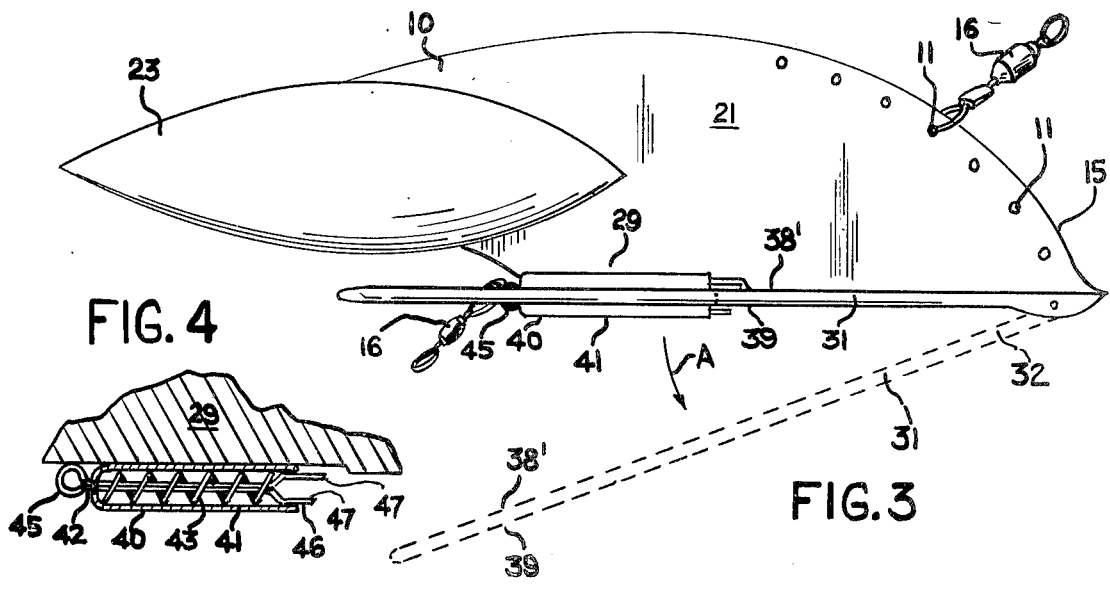

FISHING LINE SUBMERGING DEVICE

CROSS-REFERENCE TO RELATED APPLICATION

This is a continuation in part of an application filed on Nov. 9, 1976, Ser. No. 740,222 now abandoned. The parent application was entitled "FLOATING TRIP DIVER," which application was filed in the name of GEORGE B. PAGANI.

BACKGROUND OF THE INVENTION

1. Field of the Invention

The present invention relates to a fishing tackle device and more particularly a device which will cause a fishing line to submerge, during trolling, to a predetermined depth in order to be in the vicinity of fish located at such depth.

2. Description of the Prior Art

For years it was common practice to place a large sinker made of lead or cast iron on a trip release swivel several yards forward of the hook and bait for the purpose of getting the line down to the desired depth for fishing game fish which would be located at such depth. When the fist took the bait the tension on the leader line would actuate the release causing the heavy sinker to fall so that the fisherman could play the fish in a normal manner. If the weight stayed on the line it would usually tire out the fish and substantially diminish the sporting aspect of the activity. However, due to the comparatively high cost of the weights or sinkers which are lost each time a fish takes the line, a number of devices have been developed which allow the fishing line to be submerged to a desired depth without requiring the loss of a weight or sinker. An example of such a prior art device is shown in U.S. Pat. No. 2,843,966 issued to WAYNE E. INGRAM, et al, on July 22, 1958. When trolling with this device the hydrodynamic forces acting on the fishing line device itself and the leader are such that the horizontal fin assumes a predetermined downward inclination so as to create a negative lift effect as the water impinges upon the upper surface of the horizontal fin causing it to dive to a predetermined depth depending upon the speed of the trolling vessel. However, once a fish takes the bait or lure, the fixed horizontal fin creates a significant impediment to the natural movement of the fishing line and the leader as the fish and angler work in various directions while the line is being reeled in to the vessel. For example, if the fish upon taking the bait heads towards the surface of the water, the horizontal fin will create a good deal of resistance to the movement of the fish applying forces to the leader which could cause it to break. However, the angler is at a disadvantage to determine exactly what steps he should take since the feel of the line varies considerably by virtue of the imposition of the device between the fishing line and the leader. The forces acting on a body of substantial surface area, such as this prior art device, while it is immersed in water and in motion relative to the water, are extremely complex and varied as the fish moves in various directions from side to side, from higher to lower depths and, on occasion, forward of the device. Accordingly, it is very difficult for the fisherman to acquire a "feel" for fishing with such prior art device. Another device which endeavors to mitigate some of the aforementioned hydrodynamic effects is that shown in U.S. Pat. No. 2,976,642 issued to ROBERT J. WICKMAN on Mar. 28, 1961. In this device the horizontal fin is not allowed to remain in the diving attitude once the fish has taken the bait as in the device above. After the fish takes the bait and applies tension to the leader line, a detent mechanism allows the horizontal fin to rotate from a declining or diving attitude to a horizontal or "neutral" attitude. This rotation of the diving fin from a fixed lowered position to a fixed upper position does permit the fisherman to regain feel of the fishing activity with certain game fish which tend to take a course directly away from the fishing vessel and applying maximum tension on the leader line. Fish of this nature basically cause the leader line and the fishing line to come in alignment and thereby cause the horizontal fin to likewise be in substantial alignment so that the feel of the line from the fisherman to the hook is comparatively natural. However, a large number of game fish do not tend to pull directly away from the fishing line but move in directions which reduces the tension between the leader and fishing lines. For example, trout will frequently head straight for the surface of the water in an effort to shake off the hook. In many cases they will actually jump for considerable distances out of the water and sometimes to the extent that the entire leader line and the submerging device clear the water as well. As a fish darts to the surface of the water, an angle is formed between the leader line and the trolling line. The usual reaction of the angler to the reduced tension on the line is to reel in the trolling line. Hence, the lines on both ends of the device are being pulled to the surface with the horizontal fin either oscillating back and forth or presenting a flat surface to the path of travel of the device. This materially changes the normal feel for playing game fish of this nature.

It is an object, therefore, of the present invention to provide a fishing line submerging device which effectively causes the leader line to be placed at the desired depth during trolling but creates a minimum of resistance during the playing or retrieving phase of the fishing activity and, accordingly, minimizing the loss of "feel" of game fishing.

SUMMARY OF THE INVENTION

A preferred embodiment made in accordance with the principles of the present invention utilizes a horizontal fin which is rotatable with respect to a vertical fin at the most forward portion of the horizontal and vertical fins. The horizontal fin, however, is held into a predetermined fixed position while it is in a diving mode but once the fish strikes is released so as to move freely while the fish makes myriad movements in its attempt to shake loose the hook. The free movement of the horizontal vane about a large angle of rotation with respect to the vertical vane closely approximates the normal condition of the fishing line, and the angler is allowed to ply the fish in accordance with substantially normal angling techniques.

In order to more fully describe the various aspects of this invention, the following drawings and descriptions explain the various features and aspects of the device.

BRIEF DESCRIPTION OF THE DRAWINGS

FIG. 1 is a perspective view of the submerging device of the present invention.

FIG. 2 is a plan view of the present invention device.

FIG. 3 is a side view of the fishing line submerging device of the present invention.

FIG. 4 is a sectional view of the detent mechanism taken along line IV—IV of FIG. 2.

DETAILED DESCRIPTION

Figure 5:
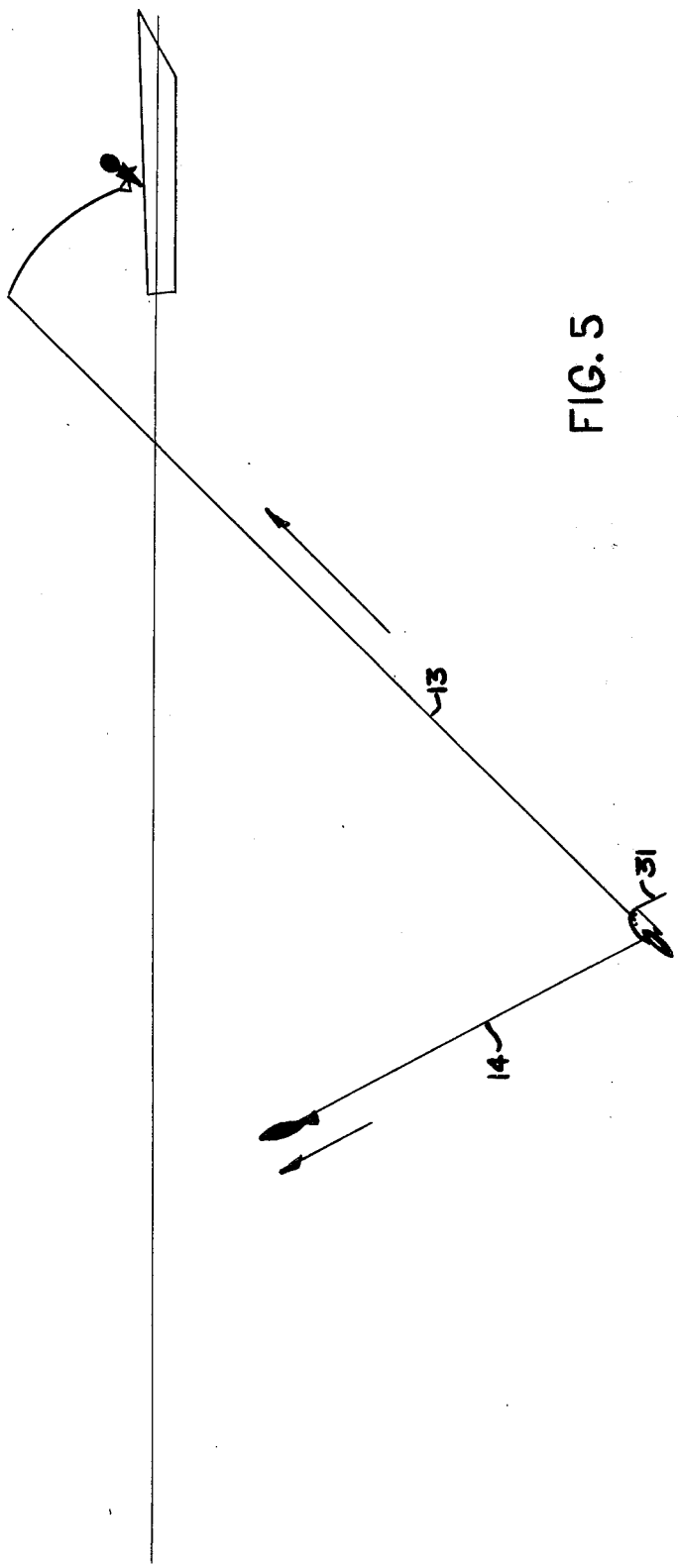
FIG. 5 is a horizontal view into a body of water showing the device of the present invention in actual use.

Referring by numerals to the accompanying drawings which illustrate a preferred embodiment of the device, in FIG. 1 the fishing line and leader submerging device 10 of the present invention is connected to the fishing line leading to the surface of the water through any one of the perforations 11. The leader line 14 is connected to a rearward portion of the device. The line 14 is connected at its terminal portion 15' to a hook. In order to maintain the vertical fin 21 in a relatively vertical position, it is desirable to have an appropriate means affixed to the device so as to maintain that attitude and, accordingly, the device is shown herein to be provided with a float 23 in the rearward portion 22 of the vertical fin. The vertical fin 21 is hinged at its forward tip 33 to the most forward portion 32 of the horizontal fin.

Referring now to FIG. 2, the hinging relationship between the horizontal fin 31 and the vertical fin 21 is more clearly shown. In this particular embodiment the horizontal fin 31 is provided with a slot 38 in the rearward portions 37 thereof. The rearward edge of the horizontal fin 31 is engaged at slot 38 by the prongs 47 of the detent mechanism 40, said prongs engaging the upper surface 38' and the lower surface 39 of the horizontal fin 31 holding it firmly in position with respect to the vertical fin 21. The detent mechanism 40 is firmly affixed to the vertical fin at the lower rearward portion thereof. The detent mechanism 40 and the vertical fin 21 must be firmly attached either by effective adhesive means or integral construction thereof, since the forces working between the horizontal fin and the vertical fin during trolling is such as to act to move the horizontal fin in a downward direction. The angle formed between the upper surface 38' of the horizontal fin 31 and an imaginary line drawn from eye 45 in the detent mechanism to the perforation 11 where the fishing line 13 is attached to a controlling factor with respect to the depth to which the unit will dive and the forces which will impinge upon the upper surface 38' of the horizontal fin 31. The relationship is such that both the depth of the unit and the forces working across surface 38' are a direct function of said angle. In other words, as the angle increases so does the depth to which the unit will dive and the forces experienced by surface 38'. Hence, as the unit is moving through the water at trolling speeds at depth, the relative motion of the body with the water creates hydrodynamic forces on the respective surfaces 38' and 39 so that less pressure is experienced at surface 39 than at 38' causing and effecting negative lift. This creates considerable downward pressure on the lower prong 47 of the detent mechanism and, in turn, on the cylindrical housing 41 as shown in FIG. 4. This creates substantial tensile forces between the housing 41 and the rearward portion 29 of the vertical fin to which the housing is affixed; accordingly, when a fish strikes the hook on the leader 14, member 42 is pulled rearward against the force of the spring 43 causing the tip 46 to slide within the housing 41 and the prongs 47 to pull clear of the rearward edge of the horizontal fin 31 thereby releasing it from its affixed relationship to the vertical fin. Since the fish will frequently attempt to shake the hook loose by heading to the surface of the water, the horizontal fin 31 will then swing in a downward direction as indicated by arrow A to the position indicated by the dotted lines in FIG. 3. However, the horizontal fin can swing through a large arc considerably in excess of 180°. For example, if the fish decided to head directly upwards and towards the boat, so that the fish and leader would be in close proximity to the trolling line, the rearward portion of the device would be swung nearly 180° in a clockwise direction. This would place the horizontal fin 31 into position of approximately 180° or more away from its original fixed position at the bottom of vertical fin 21. The improved hydrodynamic conditions existing when the horizontal fin is allowed to move freely about a forward hinge point is more clearly shown in FIG. 5. Here the fish is shown heading towards the surface of the water in order to shake loose the hook. The horizontal fin 31 is allowed to assume whatever attitude is necessary to create the minimum hydrodynamic resistance to the leader-troll line system. The horizontal or diving fin 31, in effect, follows the direction of the fish no matter whether it moves up, down, away from or toward the boat. Even if the fish jumps out of the water to a sufficient heighth to cause the diver to clear the water, the horizontal fin upon reentry into the water will automatically adjust to provide the least possible resistance to the leader line. This minimizes the possibility of excessive forces being imposed on the leader line thereby causing it to break. Although the design of the present invention is such that the horizontal fin 31 is free to swing through an arc in excess of 270° or until surface 39 meets with leading edge 15 of the vertical plane, it has been found that freedom of movement in an arc of 180° is usually sufficient for most gaming purposes. Accordingly, to avoid entanglement of the horizontal fin with the trolling line or to cause the horizontal fin to be inadvertently caught in an upward position and thereby creating resistance while the line is being pulled inward, it has been found that appropriate stopping mechanisms can be used to limit the swing to approximately 180°. For example, a small protrusion can be extended beyond the tip 33 so as to engage the forward portion of surface 39 as it swings up to the 180° point thereby inhibiting further arcuate movement.

Appropriate means for connecting the troll line and the leader line to the device are conventional swivels 16. Numerous variations may be employed in the construction of the device of the present invention. For example, an alternative design would be to avoid the slot 38 in the horizontal fin 31 and simply have the detent mechanism engage the horizontal fin 31 at a rearward edge thereof as it swings flat against lower edge 25 of the vertical fin 21.

From the foregoing description, it will be readily seen that there has been produced such a fishing line submerging device as substantially fulfills the object of the invention as set forth herein.

While the specification sets forth in detail the present and preferred construction of the fishing line submerging device, in actual practice deviations from such detail may be resorted to without departing from the spirit of the invention, as defined in the appended claims.

I claim:

1. A fish-line submerging device for submerging a fishing line and leader to a predetermined depth comprising, a vertical fin having a substantially flat lower edge, a forward tip and an upper edge, means for causing the vertical fin to assume a substantially vertical attitude in water, the horizontal fin having a forward point and a rearward edge with said forward point rotatively affixed to said forward tip of the vertical fin, a detent member affixed to the rearward portion of said flat lower edge of the vertical fin, means for urging said detent member into locking contact with the rearward edge of the horizontal fin, means for attaching the leader to said detent member at an attaching position, a series of means for attaching the fishing line at a predetermined attaching point at said upper surface of the vertical fin, whereby upon a predetermined tension in said leader line, the detent mechanism releases the horizontal fin and the fin thereby rotates freely about the vertical fin at its forward tip.

2. A fishing line submerging device as in claim 1 wherein the upper surface of the vertical fin is an arcuate surface.

3. A fishing line submerging device as in claim 2 wherein the series of means for attaching the fishing line at a predetermined attaching point at said arcuate upper surface constitutes a series of perforations beginning at a position close to said edge near the horizontal fin and extending upward for a considerable distance along said arcuate edge.

4. A fishing line submerging device as in claim 3 wherein the means for causing the vertical fin to assume a substantially vertical attitude in water is a float located in the upwardly rearwardly portion of the vertical fin.

* * * * *